United States Patent [19]
DeYoung

[11] Patent Number: 4,667,206
[45] Date of Patent: * May 19, 1987

[54] INK JET APPARATUS AND METHOD OF OPERATING THE INK JET APPARATUS WHEREIN PHASE CHANGE INK IS SUPPLIED IN SOLID-STATE FORM

[76] Inventor: Thomas W. DeYoung, Overhill Rd., Stormville, N.Y. 12582

[ * ] Notice: The portion of the term of this patent subsequent to Sep. 3, 2002 has been disclaimed.

[21] Appl. No.: 854,332

[22] Filed: Apr. 21, 1986

Related U.S. Application Data

[63] Continuation of Ser. No. 660,657, Oct. 15, 1984, abandoned.

[51] Int. Cl.⁴ ........................ G01D 9/00; G01D 15/16
[52] U.S. Cl. ................................ 346/1.1; 346/140 R
[58] Field of Search .................. 346/1.1, 140, 76 PH; 400/120, 126

[56] References Cited

U.S. PATENT DOCUMENTS

| | | | |
|---|---|---|---|
| 3,653,932 | 4/1972 | Berry et al. | 106/22 |
| 3,715,219 | 2/1973 | Kurz et al. | 106/22 |
| 3,773,069 | 11/1973 | Rebentisch | 222/146 HE |
| 4,238,807 | 12/1980 | Bovio | 346/140 PD |
| 4,312,009 | 1/1982 | Lange | 346/140 PD |
| 4,332,487 | 6/1982 | Bovio | 346/140 PD |
| 4,390,369 | 6/1983 | Merritt et al. | 106/20 |
| 4,392,146 | 7/1983 | Bovio | 346/140 PD |
| 4,443,820 | 4/1984 | Mutoh et al. | 346/75 |
| 4,462,035 | 7/1984 | Koto | 346/76 PH |
| 4,484,948 | 11/1984 | Merritt et al. | 106/30 |
| 4,490,731 | 12/1984 | Vaught | 346/140 PD |
| 4,495,507 | 1/1985 | Mariguchi et al. | 346/76 PH |
| 4,539,568 | 9/1985 | Lewis | 346/140 PD |
| 4,593,292 | 6/1986 | Lewis | 346/140 PD |
| 4,607,266 | 8/1986 | DeBonete | 346/140 PD |
| 4,609,924 | 9/1986 | DeYoung | 346/140 PD |

FOREIGN PATENT DOCUMENTS

| | | |
|---|---|---|
| 0097823 | 1/1984 | European Pat. Off. . |
| 55-54368 | 4/1980 | Japan . |
| 56-113462 | 9/1981 | Japan . |

OTHER PUBLICATIONS

New Ink Writing Methods for Graphic Recording, Owens, 1965.
IBM Disclosure Bulletin, vol. 26, No. 3, Aug. 1983.
"High Frequency Oscillography with Electrostatically Deflected Ink Jets", by Richård G. Sweet, Mar. 1964.

*Primary Examiner*—F. A. Goldberg
*Assistant Examiner*—Mark Reinhart

[57] ABSTRACT

An ink jet apparatus employs phase change ink which may be heated for jetting and is characteristically solid at room temperature. The ink is delivered and then advanced to a melting location in the solid state. At the melting location, the ink is changed to liquid state, whereupon it is jetted. The ink in the solid state takes the form of pellets which are advanced by a carrier.

4 Claims, 11 Drawing Figures

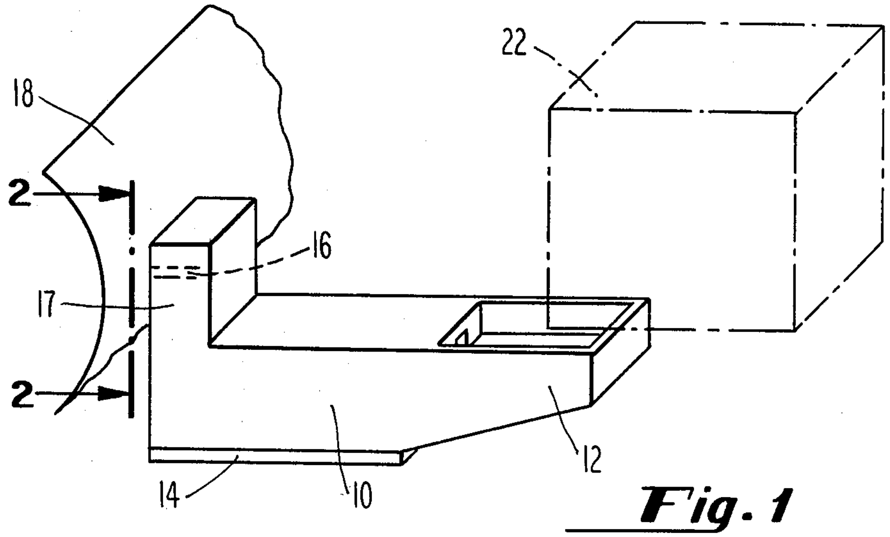
Fig. 1
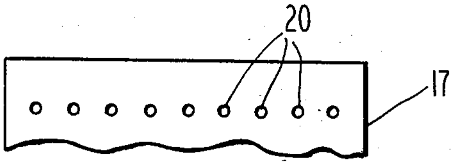
Fig. 2
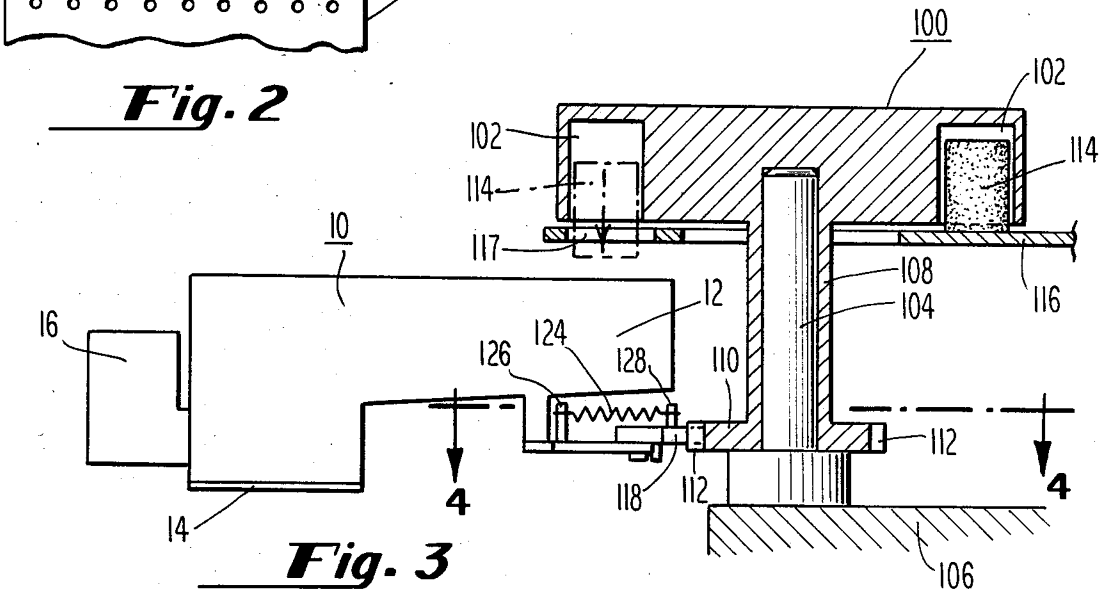
Fig. 3
Fig. 4
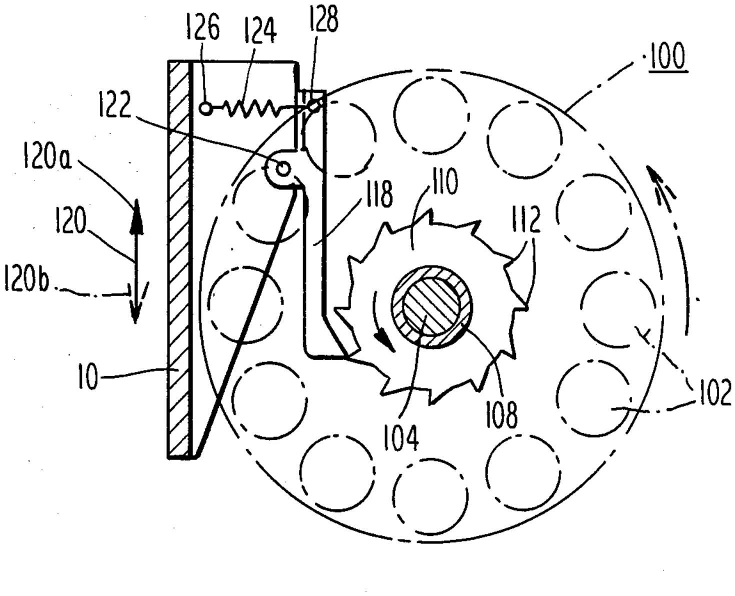

INK JET APPARATUS AND METHOD OF OPERATING THE INK JET APPARATUS WHEREIN PHASE CHANGE INK IS SUPPLIED IN SOLID-STATE FORM

BACKGROUND OF THE INVENTION

This is a continuation of application Ser. No. 660,657 filed Oct. 15, 1984, now abandoned.

This invention relates to an ink jet wherein the ink employed within the jet is of the phase change type which may be referred to as hot melt ink.

A phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984. The hot melt ink may be jetted from a variety of apparatus including those disclosed in the aforesaid copending application.

When employing ink in a liquid state, the delivery of the ink, is, of course, dictated by the liquid state. Typically, the ink is contained within a closed vessel of some sort prior to delivery to the ink jet. When employing hot melt ink, the delivery of ink requires a different approach in order to provide a reliable supply and minimize operator intervention.

SUMMARY OF THE INVENTION

It is a further object of this invention to provide a hot melt ink delivery system wherein the ink may be reliably supplied to the ink jet apparatus.

In accordance with these and other objects of the invention, ink is delivered and advanced in the solid state to a melting location. The ink is then melted at the melting location so as to change the ink from a solid state to a liquid state. The ink is then supplied in the liquid state to the ink jet and ejected as droplets of ink from the ink jet.

BRIEF DESCRIPTION OF THE DRAWINGS

FIG. 1 is a perspective view of an ink jet apparatus of the phase change type adapted to be used in conjunction with this invention;

FIG. 2 is a orifice plate illustrating the array of ink jets employed in the apparatus of FIG. 1;

FIG. 3 is a sectional view of one embodiment of the invention which may be utilized in conjunction with the apparatus of FIGS. 1 and 2;

FIG. 4 is a view of the apparatus of FIG. 3 taken along line 4—4;

DETAILED DESCRIPTION OF A PREFERRED EMBODIMENT

Figure 5:
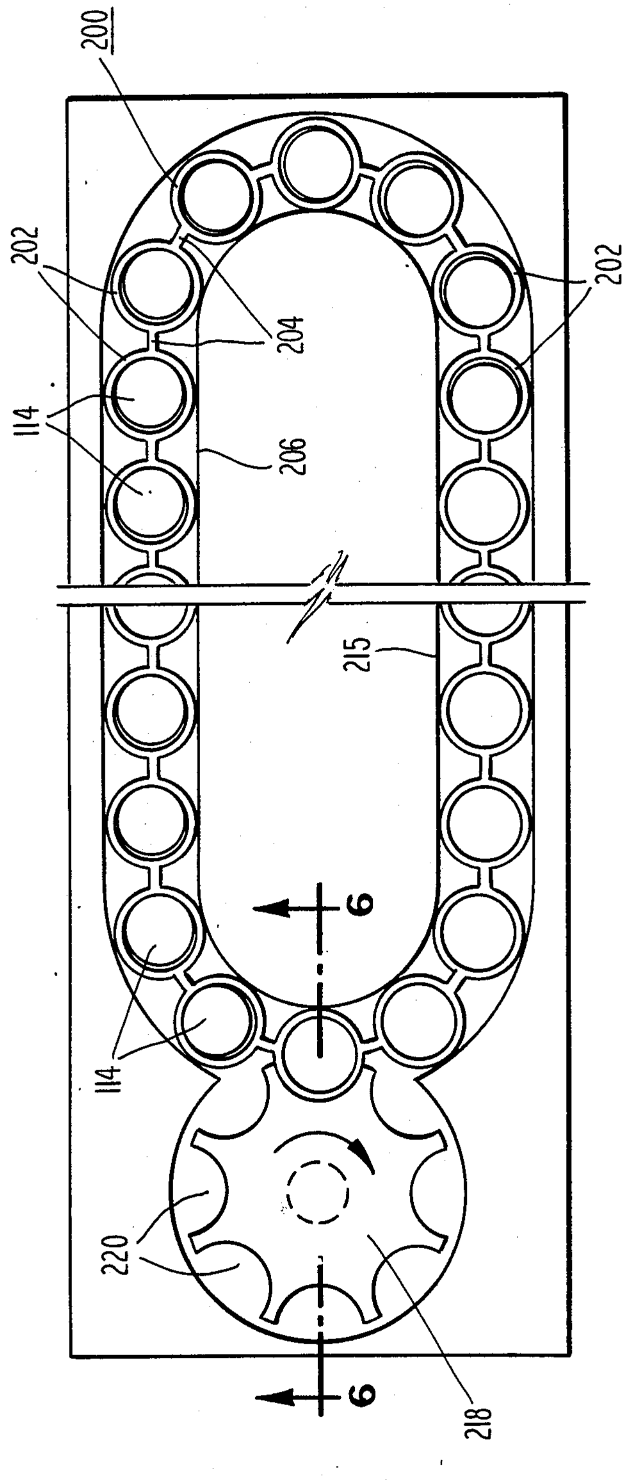
FIG. 5 is a plan view another embodiment of the invention capable of use in conjunction with the apparatus of FIGS. 1 and 2.

Referring to FIG. 1, a demand ink jet apparatus is disclosed comprising a head containing a reservoir 10 for ink which is adapted to be supplied in solid state form at a trough 12. Ink received in the trough 12 is elevated in temperature by means of a heater 14 located at the base of the reservoir 10 so as to permit the ink to be supplied in a liquid state to jets 16 of an imaging head 17 juxtaposed to an ink receiving sheet 18 supported on a platen. The jets 16 are arranged in an array with the orifices 20 substantially aligned as shown in FIG. 2.

Particular details of the head shown in FIGS. 1 and 2 disclosed in copending application Ser. No. 661,794 filed Oct. 16, 1984, which is incorporated herein by reference. Various details of the operation of the jets 16 are described in detail in copending application Ser. No. 576,582, filed Feb. 3, 1984, and U.S. Pat. No. 4,459,601, which are assigned to the assignee of this invention and incorporated herein by reference.

In accordance with this invention, the trough 12 is supplied by ink from a carrier 22. The carrier may take on a variety of figurations so as to reliably deliver individual members or pellets of ink in solid state form with a minimum of human intervention. The nature of the apparatus 22 will now be discussed with reference to various embodiments of the invention described in various figures herein.

Referring to FIGS. 3 and 4, the trough 12 supplied by a turret 100 containing a plurality of circumferentially disposed cylindrical pockets 102. The turret 100 revolves about an axially located pin 104 supported from the frame 106 of the apparatus. In this connection, turret 100 includes a sleeve 108 which slips over the pin 104. The base of the sleeve 108 includes a flange 110 with sprocket teeth 112.

As shown in FIG. 3, the pellets 114 located within the pockets 102 are supported by a horizontally extending plate 116. The plate 116 which is stationary includes an opening 117 which is located just above the trough 12. As shown in FIG. 3, the pellet 114 drawn in phantom is dropping through the opening 117 into the trough 12.

The drive mechanism for the turret 100 includes the sprocket teeth 112 operating in conjunction with the spring loaded drive dog 118 shown in FIGS. 3 and 4. As shown in FIG. 4 by arrows **120*a* and 120*b*, the head 10 is movable. When the head 10 advances in the direction of arrowhead 120*a*, the dog 118 is withdrawn and the turret 100 remains in the position shown. However, as the head 10 moves in the direction depicted by arrow 120*b*, the advancing dog 118 engages the sprocket 112 so as to revolve the turret 100 a few degrees (a locking pawl not shown prevents a reversal of the turret motion). Such a few degrees of revolution will advance the next pocket 102 to the discharge location of the opening 117 so as to allow the next pellet 114 fall into the trough 12. As shown in FIG. 4, the dog 118 pivots about a pin 122. A spring 124 attached to the end of the dog 118 opposite the sprocket 112 allows the dog 118 to move into and out of engagement with the sprocket 112 so as to only advance the turret 100 and not reverse the turret. As shown in FIG. 3, spring 124 is attached to pins 126 and 128 mounted on the head 10 of the dog 118** respectively.

It will be appreciated that the apparatus of FIGS. 3 and 4 provide means for advancing the ink in its solid stat pellet form to the melting location of the head. Of course, once the pellets reach the head, they are melted and supplied to the ink jets for ejecting droplets on demand from the jets 16. As shown in FIG. 3, the pellets 114 are substantially cylindrical and the pockets 102 within the turret 100 conform to the pellets and are therefore substantially cylindrical. Accordingly, the pellets 114 may fall through the discharge opening 117 and are advanced along the axes of the pellet as they fall under the influence of gravity into the trough 12.

In accordance with another important aspect of the invention, the turret or wheel 100 is readily removable such that the carrier of the pellets is in effect a removable cartridge. The cartridge may then be preloaded with pellets 114 before mounting on the pin 104. The pellets 114 may be held in place within the cartridge during mounting by a removable sheet-like material such as a thin cardboard member which may be pulled free of the turret 100 between the plate 115 and the portion of the revolving turret 100 which carries the pellets 114. It will also be appreciated that the turret 100 as well as the sleeve 108 the flange 110 may be removed as a unit along with the plate 116.

As shown in FIGS. 3 and 4, the carrier or cartridge comprises a wheel or turret 100 which carries the pellets 114 in a substantially horizontal plane. It will now be appreciated that other mechanisms may be utilized.

Figure 6:
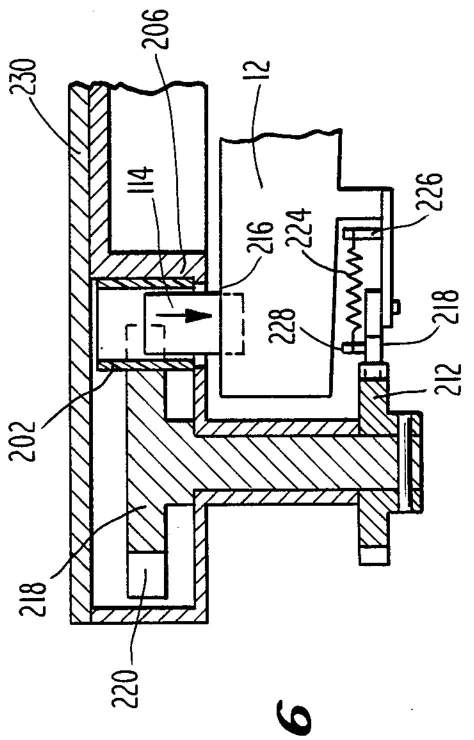
FIG. 6 is a sectional view of the apparatus of FIG. 5 taken along line 6—6.

Referring to FIGS. 5 and 6, a revolving carrier, articulated, chain-like carrier 200 is disclosed. The carrier includes a plurality of pockets 202 which receive pellets 114 of substantially cylindrical shape so as to conform with the shape of the pockets 202. The pockets 202 are interconnected by linkages 204 so as to assume an oval configuration as shown in FIG. 5 by virtue of an oval shaped guide 206 along which the pockets 202 slide. As in the case of the embodiments in FIGS. 3 and 4, the pellets 114 are supported within the pockets 202 by a substantially horizontally extending member 215 which includes a discharge opening 216 located above the trough 12. As shown in FIG. 6, the pellet 114 is falling through the discharge opening 217 into the trough 12.

In this embodiment of the invention, the revolving, articulated carrier 200 is driven by a gear 218 having recesses 220 which contact the exterior of the pockets 202. The gear 218 also includes a flange 212 forming a sprocket as shown in FIG. 4 which is engaged by a dog 218 of the type shown in FIG. 4. As the head 10 advances, the sprockets on the flange 212 are advanced which in turn advances the recesses 220 so as to drive the revolving, chain-like carrier 200. The dog mechanism 218, posts 226 and 228 and spring 224 are substantially identical to those shown in FIGS. 3 and 4. A locking pawl not shown prevents a reversal in the movement of the dog 218.

As shown in FIG. 6, the carrier 200 is covered by a plate 230. Where the carrier 200 takes the form of a removable cartridge, the plate 230 is removable so as to permit the carrier 200 to be loaded with pellets 114. Where the carrier is to be utilized as a cartridge, the entire carrier including the gear 118 may be removed and replaced by another cartridge filled with pellets 114.

Figure 7:
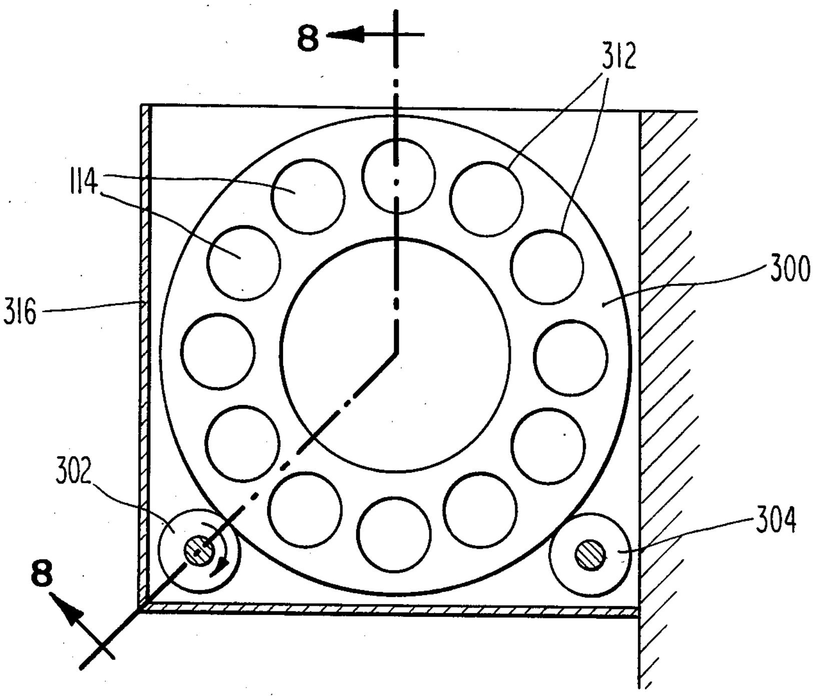
FIG. 7 is a plan view of yet another embodiment of the invention capable of use with the apparatus of FIGS. 1 and 2.
Figure 8:
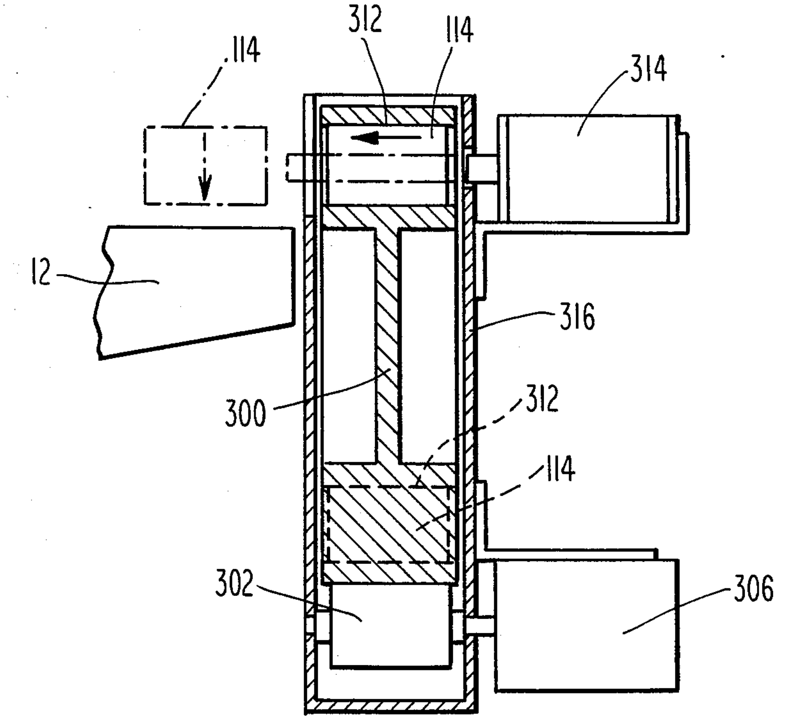
FIG. 8 is a sectional view of the apparatus of FIG. 7 taken along line 8—8.

In the embodiments of FIGS. 3 through 6, pellets 114 revolve in a horizontal plane and the axes of the pellets are vertical. Reference will now be made to the embodiments of FIGS. 7 and 8 where the pellets 114 revolve in a vertical plane and the axes of the pellets are horizontal. A revolving turret 300 is again employed. However, in this embodiment, the turret is supported on two rollers 302 and 304 which not only support but also revolve the turret 300. As best shown in FIG. 8, the roller 302 is coupled to a motor 306. As the roller 302 rotates, the roller 302 engages the exterior of the turret 300 so as to cause the turret 300 to revolve about its axis.

The turret 300 include a plurality of cylindrical pockets 312 which receive the pellets 114. In order to push the pellets 114 along their longtudinal axes, a solenoid 314 is provided. When the particular pocket 312 reaches the discharge position so as to be located above the trough 12 as shown in FIG. 8, a solenoid 314 is energized so as to push pellet 114 along its longitudinal axis, whereupon gravity will allow the pellet 114 to fall into the trough 12.

The turret 300 is enclosed within a housing 316. The entire housing 316 as well as the motors 306 and the solenoid 314 may be removable as a cartridge. In the alternative, the solenoid 314 and the motors 306 may remain with the appropriate coupling to the turret 300 so as to permit the turret 300 as well as the housing 316 to be removed as a cartridge.

Figure 9:
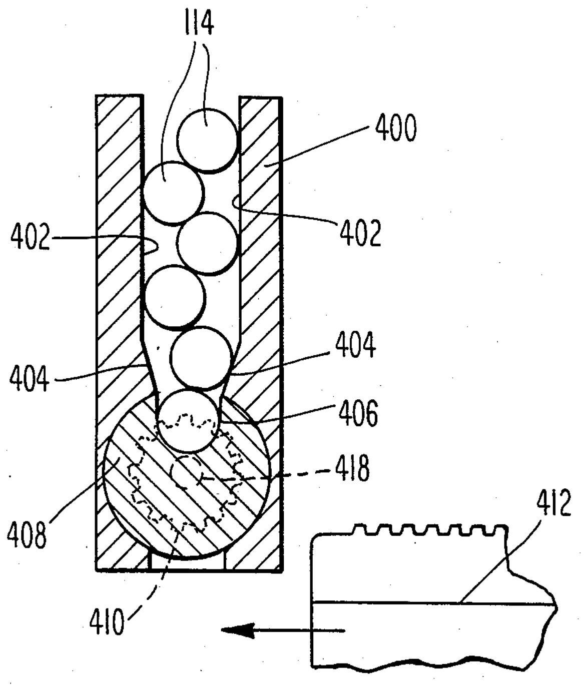
FIG. 9 is a sectional view of yet another embodiment of the invention adapted for use with the apparatus of FIGS. 1 and 2.
Figure 10:
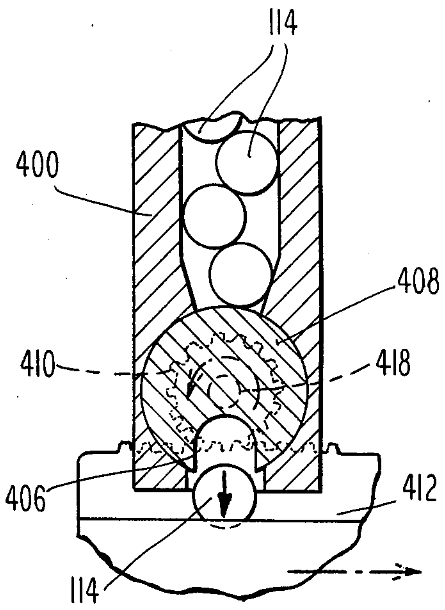
FIG. 10 is a sectional view of the apparatus of FIG. 9 at a subsequent point in time when a pellet is being discharged from the apparatus shown in FIG. 9.
Figure 11:
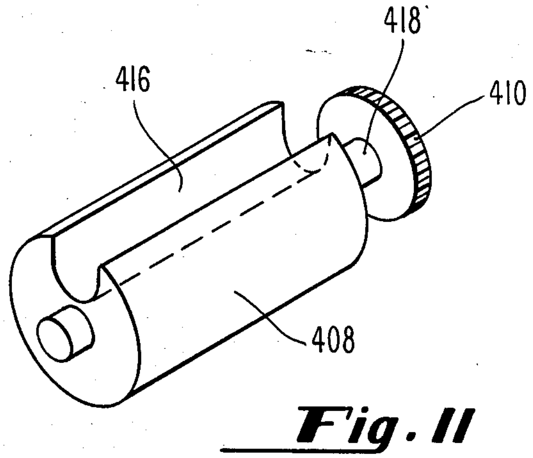
FIG. 11 is a perspective view of the gate means on the apparatus shown in FIGS. 9 and 10.

Reference will now be made to FIGS. 9 through 11 in connection with another embodiment of the invention. As shown in FIGS. 9 and 10, the pellets 114 are stacked within a bin 400 having walls 402 with the axes horizontal. The walls 402 are sufficiently closely spaced relative to the diameters of the pellets 114 such that one wall 402 is always in contact with at least one pellet 114. In addition, the walls 402 are tapered at 404 into the vertex 406 of the bin where the pellet 114 is received by a gate 408. The gate itself revolves at the base of the bin 400 by virtue of a gear 410 which is engaged by a rack 412 mounted on the head 10. As the head 10 advances into place, the rack 412 will engage the gear 410 and rotate the gate 408 so as to allow the pellet at the vertex of the bin 400 to move to a discharge position as shown in FIG. 10 and fall under the influence of gravity into the trough 12.

Referring to FIG. 11, the configuration of the gate 408 is disclosed. The gate 408 includes a substantially cylindrical member with a recess 416. The gate 408 also includes a shaft 418 coupled to the gear 410. The recess 416 is sufficiently deep so as to receive the pellet 114 and can permit rotation of the gate 408 and discharge of the pellet 114 without interference with the walls of the bin.

As in the other embodiments, the bin-type approach to pellet feeding lends itself to a cartridge In this connection, the entire bin including the gate 408 may be removable.

It will be appreciated that in each of the embodiments previously described, a plurality of pellets are supported in a carrier which may be a removable cartridge. The pellets are then advanced in the carrier on a sequential basis to a discharge position from where they fall under the influence of gravity and into the trough 12. It will be appreciated that pellets 114 slide as well as roll along the walls of the bin. It will be appreciated that other carrier and cartridge approaches may be utilized including the ones disclosed in copending applications Ser. No. 661,922, filed Oct. 16, 1984, Ser. No. 660,658, filed Oct. 15, 1984, now U.S. Pat. No. 4,593,292, Ser. No. 661,701, filed Oct. 17, 1984 and Ser. No. 661,034, filed Oct. 16, 1984, now U.S. Pat. No. 4,609,924, which are assigned to the assignee of this invention and incorporated herein by reference. Details concerning the preferred ink are described in U.S. Pat. 4,390,369 and pending U.S. applications Ser. No. 610,627, filed May 16, 1984, Ser. No. 565,124, filed Dec. 23, 1983 and Ser. No. 644,542, filed Aug. 27, 1984, all of which are assigned to the assignee of this invention and incorporated herein by reference. Moreover, the pellets may have various sizes and shapes.

Although particular embodiments of the invention have been shown and described and other referenced, other embodiments and modifications will occur to those who are skilled in the art which will fall within the true spirit of the scope of the invention is set forth in appended claims.

I claim:

1. A method of operating an ink jet apparatus comprising the following steps:

delivering ink in a solid state form in the apparatus;

advancing ink in the solid state form in the apparatus;

melting the ink so as to change the ink from a solid state to a liquid state;

supplying ink in the liquid state to an ink jet; and ejecting droplets of ink from the ink jet.

2. The method of claim 1 wherein said step of advancing includes falling under the influence of gravity.

3. The method of claim 2 wherein said step of advancing includes passing through an opening having substantially the same shape as the ink in solid state form.

4. The method of claim 3 wherein said opening is circular and said ink in solid state form is cylindrical.

* * * * *